United States Patent

Kohno et al.

[11] Patent Number: 5,520,271
[45] Date of Patent: May 28, 1996

[54] SYSTEM FOR MINIMIZING VIBRATIONS OF CRANKSHAFT

[75] Inventors: Satoshi Kohno; Toshio Harima; Daisuke Sibata, all of Atsugi, Japan

[73] Assignee: Unisia Jecs Corporation, Atsugi, Japan

[21] Appl. No.: 272,580

[22] Filed: Jul. 11, 1994

[30] Foreign Application Priority Data

Aug. 18, 1993 [JP] Japan ................... 5-044810 U

[51] Int. Cl.$^6$ ............... F16F 15/30; F16F 15/14
[52] U.S. Cl. .......................... 192/30 V; 74/574
[58] Field of Search .............. 192/30 V, 70.17; 74/574

[56] References Cited

U.S. PATENT DOCUMENTS

| | | | |
|---|---|---|---|
| 2,346,972 | 4/1944 | Kishline | 74/574 |
| 4,594,917 | 6/1986 | Ziegler | 74/572 |
| 5,253,740 | 10/1993 | Kohno et al. | 192/30 V X |
| 5,272,937 | 12/1993 | Brosowske et al. | 74/574 X |
| 5,295,411 | 3/1994 | Speckhart | 74/574 |
| 5,351,574 | 10/1994 | Hiraishi et al | 74/574 |

FOREIGN PATENT DOCUMENTS

| | | |
|---|---|---|
| 4328927 | 3/1994 | Germany . |
| 57-67141 | 4/1982 | Japan . |

*Primary Examiner*—Rodney H. Bonck
*Attorney, Agent, or Firm*—Foley & Lardner

[57] ABSTRACT

A driver disc has a series of pockets spaced along a circle about an axis of rotation thereof and inertia weights positioned and arranged to roll in the respective pockets. The driver disc is secured to the engine crankshaft for rotation therewith. A flywheel is secured to the driver disc for rotation therewith. A clutch has a friction pad assembly in engagement with the flywheel. The driver disc is resilient and possesses a first rigidity, within a plane normal to the axis of rotation, high enough to transmit torque between the engine crankshaft and the flywheel and a second rigidity, within a plane including said axis, which is lower than the first rigidity. With this system, transmission of heat generated due to frictional engagement between the flywheel and friction pad assembly to the pockets has been reduced.

6 Claims, 3 Drawing Sheets

5,520,271

SYSTEM FOR MINIMIZING VIBRATIONS OF CRANKSHAFT

BACKGROUND OF THE INVENTION

The present invention relates to a system for minimizing vibrations in the crankshaft of an internal combustion engine.

The crankshaft of an automotive engine is subjected to a series of impulses due to the action of various connecting rods applying forces thereto. When these impulses are applied to the crankshaft in the same plane as the natural frequency of vibration of the crankshaft, undesirable vibrations are set up and certain mechanisms have been employed to dampen or retard these vibrations.

It has been suggested to mount a series of inertia members or weights on a flywheel attached to the end of the crankshaft. The inertia weight is relatively free to move both radially and rotatively with respect to the crankshaft and to receive energy from and impart energy to the crankshaft to produce the desired dampening effect.

An object of the present invention is to adapt the above-mentioned suggestion to a flywheel which is a part of a friction clutch such that a series of inertia weights are not subjected to damage due to heat generated by friction between the flywheel and a friction pad assembly of the clutch.

SUMMARY OF THE INVENTION

According to the present invention, there is provided a system for minimizing vibrations in an engine crankshaft, comprising:

a friction clutch having a friction pad assembly;

a flywheel which is a part of said friction clutch and engageable with said friction pad assembly;

a driver disc secured to the engine crankshaft and said flywheel for rotation therewith about an axis of rotation of the engine crankshaft;

said driver disc being resilient and possessing a first rigidity, within a plane normal to said axis, high enough to transmit torque between said engine crankshaft and said flywheel, and a second rigidity, within a plane including said axis, which is lower than said first rigidity, said driver disc having a series of pockets spaced along a circle about said axis of rotation and inertia weights positioned and arranged to roll in said respective pockets.

DESCRIPTION OF THE EMBODIMENT

Figure 1:
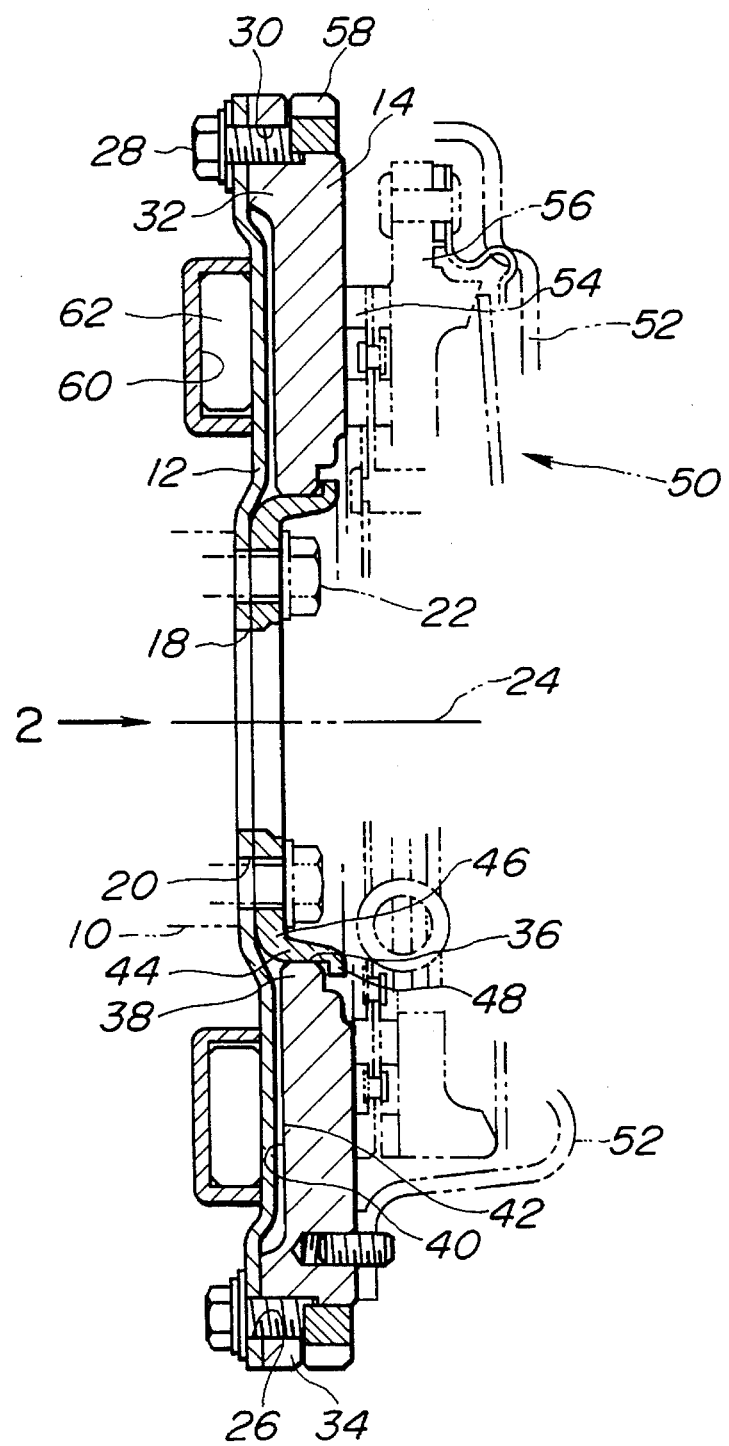
FIG. 1 is a sectional view taken through the line 1—1 of FIG. 2, showing an embodiment according to the present invention.

FIG. 1 shows a crankshaft 10 of an automotive internal combustion engine, a driver disc 12, and a flywheel 14.

Figure 2:
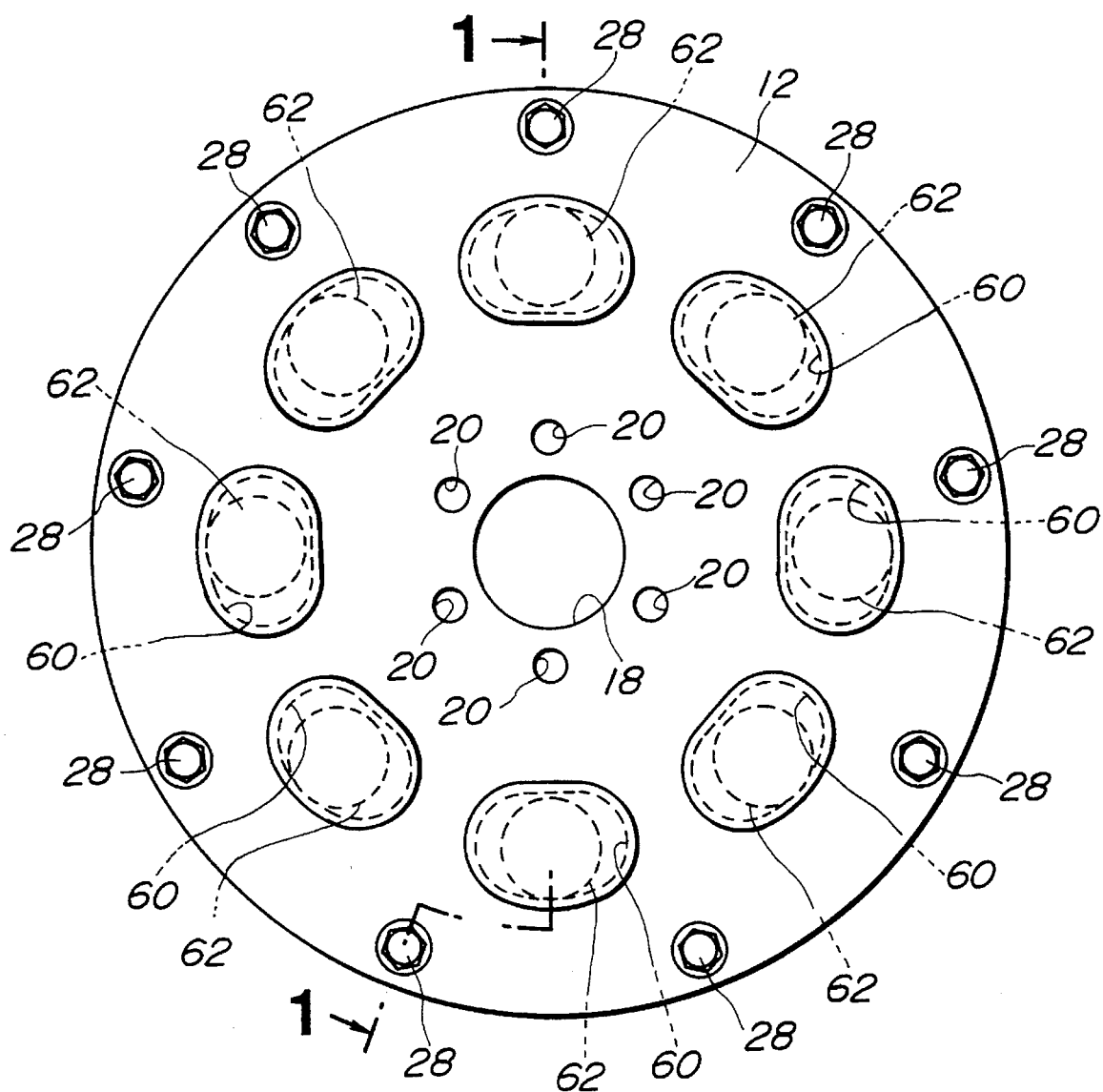
FIG. 2 is a front elevation, reduced in size, of the embodiment as viewed along an arrow 2 in FIG. 1 with the engine crankshaft removed.

As best seen in FIG. 2, the driver disc 12 has a central circular aperture 18 and a series of inner holes 20 spaced equi-distant along a concentric circle with the circular aperture 18. Through these holes 20, the driver disc 12 is secured to a rear axial end of the crankshaft 10 by means of cap screws or bolts 22 for rotation therewith about an axis 24. Adjacent its outer circumference, the driver disc 12 has a series of holes 26 spaced equi-distant along a cicle about the axis 24. Through these holes 26, the driver disc 12 is secured to the flywheel 14 by means of cap screws or bolts 28.

The cap screws 28 are threadedly engaged into the respective tapped holes 30 which an axially projecting enlargement 32 of the flywheel 14 is formed with. The axially projecting enlargement 32 extends along a circle about the axis 24 and disposed adjacent an outer edge or circumference 34 of the flywheel 14. The flywheel 14 has a central aperture 36 and an inner edge or circumference 38 defining the central aperture 36. The flywheel 14 has a recess 40 which extends from the inner edge 38 radially outwardly to the axially projecting enlargement 32. The driver disc 12 abuts the axially projecting enlargement 32 to define a space 42.

A control or reinforcement ring 44 is disposed in the central aperture 36 of the flywheel 14 and has a flange 46 at one axial end thereof. Through this flange 46, the control ring 44 is fixedly attached to the driver disc 12 by means of the cap screws 22. In order to limit axial displacement, with respect to the axis 24 of the inner edge 38 of the flywheel 14, of the inner edge 38 of the flywheel 14 relative to the driver disc 12, the control ring 44 has a stop 48.

The opposite side of the flywheel 14 carries a friction clutch 50. The friction clutch 50 is of the conventional type including a clutch cover 52, a friction pad assembly 54, and a pressure plate 56 biasing the friction pad into firm engagement with the opposite side of the flywheel 14. Heat is generated owing to frictional engagement of the friction pad assembly 54 with the flywheel 14. Since the driver disc 12 is in direct contact with the flywheel at their radially outer edges only and the space 42 is provided, the transfer of heat from the flywheel 14 to the driver disc 12 is minimized.

At its outer circumference, the flywheel 14 carries a ring gear 58.

The flywheel 14 is of a rigid inertia member, while the driver disc 12 is a resilient plate. The driver disc 12 possesses a first rigidity, within a plane normal to the axis 24, high eoungh to transmit torque between the engine crankshaft 10 and the flywheel 14, and a second rigidity, within a plane including the axis 24, which is lower than the first rigidity. In other words, the disc 12 is resilient within the plane including the axis 24.

The driver disc 12 has a series of pockets 60 which are spaced equi-distant along a circle about the axis 24 and cylindrical inertia weights 62 positioned and arranged to roll in the respective pockets 60.

When the crankshaft 10 is rotating, the inertia weights 62 will be urged against the radially outer surface of the pockets 60 and will assume the position as shown in FIG. 2. If the speed of the crankshaft 10 were to remain perfectly constant, the inertia weights 62 would remain in this position at all times. However, the crankshaft 10 speed does not remain constant but is subjected to a series of impulses tending to accelerate and decelerate the speed of the crankshaft 10, the driver disc 12 and the flywheel 14.

Figure 3:
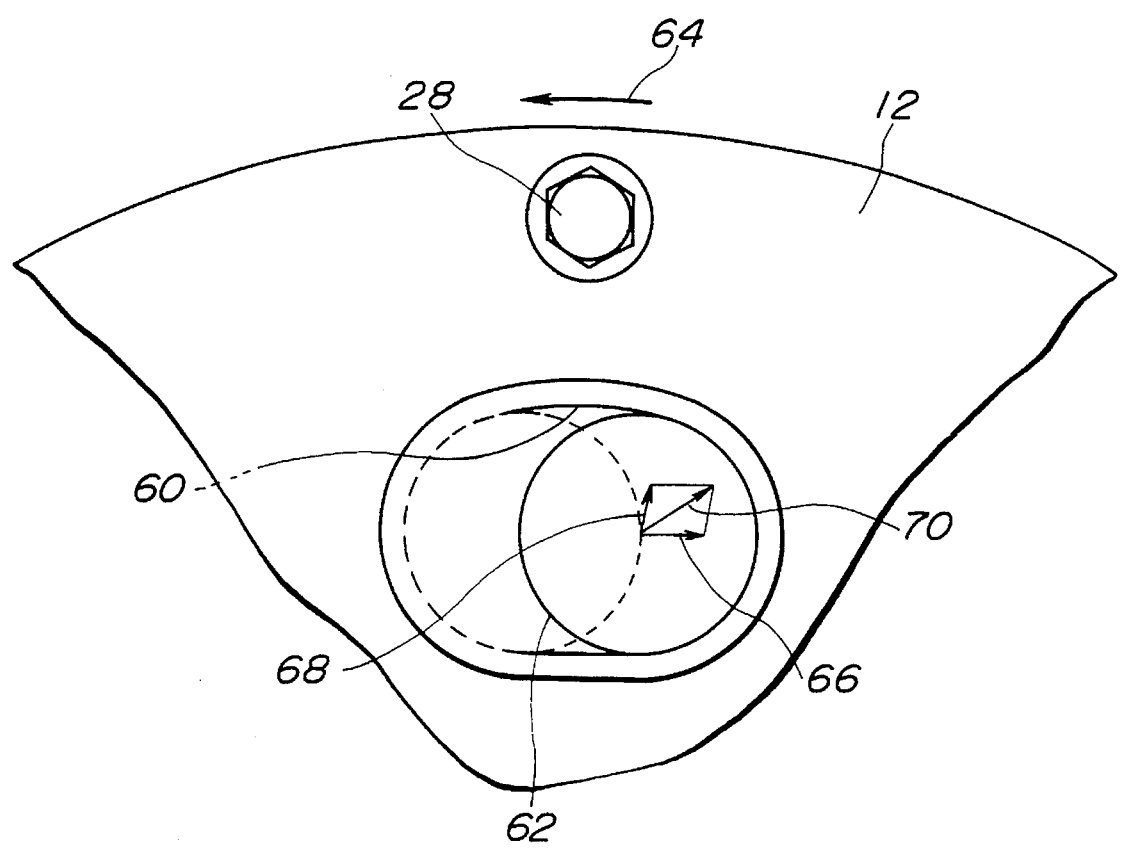
FIG. 3 is a fragmentary enlarged view of FIG. 2 and shows the various positions taken by the inertia weight during rotation of the crankshaft.

The action of the inertia weights 62 during acceleration and deceleration of the crankshaft 10 and the driver disc 12 is most clearly illustrated in FIG. 3 in which one of the inertia weights 62 is shown to have moved along the surface of the pocket 60. Assuming the acceleration of the driver disc 12 to be in the direction indicated by the arrow 64, the energy of the mass will exert a force to the right indicated by the vector 66. The centrifugal force acting upon the inertia weight 62 will continute to act radially outwardly of the driver disc 12 as indicated by the vector 68. The resultant of these two vectors is indicated at 70 and indicates that the inertia weight 62 will exert a force against the side wall of the pocket 60 opposing the forces tending to accelerate the driver disc 12 and the flywheel 14 and consequently leading to reduce the acceleration.

Attention is called to the fact that the inertia weight 62 has been moved radially inwardly against the action of the centrifugal force and to the right against the inertia force. The inertia weight 62 has thus stored up energy which has been removed from the driver disc 12, the flywheel 14 and the crankshaft 10. As the acceleration of the crankshaft 10, the driver disc 12 anmd the flywheel 14 is reduced to zero, the centrifugal force acting on the inertia weight 62 returns the inertia weight 62 to the outside of the pocket 60 as shown in FIG. 2. While the exact movement of the inertia weights 62 cannot be watched due to the high speed rotation of the driver disc 12 on which they are carried, it is believed that the energy stored in the inertia weight 62 as just explained will cause inertia weight 62 to overrun its center position and move slightly to the left as indicated by the dotted lines in FIG. 3 and thus add energy to the crankshaft 10, the driver disc 12 and the flywheel 14. The inertia weights 62 are believed to oscillate between the two positions shown in FIG. 3 alternately absorbing and returning energy to the driver disc 12 and the flywheel 14. Since this oscillation will be out of phase with the natural frequency of oscillation of the crankshaft 10, it will act to counteract or smooth out the vibration of the crankshaft 10.

Owing to frequent engagement and disengagement of the friction clutch50, the flywheel 14 stores energy of heat generated by friction between the friction pad assembly 54 and the adjacent face of the flywheel 14. This energy is dissipated to the environment through the outer circumference of the flywheel 14. Since the direct contact between the driver disc 12 and the flywheel 14 is limited at the axially projecting enlargement 32 leaving the space 42 therebetween, the teransfer of heat from the flywheel 14 to the driver disc 12 on which the pockets 60 and the cylindrical inertia weights 62 are carried is minimized. Thus, the cylindrical inertia weights 62 and the pockets 60 do not receive any damage due to heat and will have increased endurability.

Attention is also called to the fact that flexural vibrations of the crankshaft 10 can be modified by the resiliency the driver disc 12. Thus, a resonant frequency of flexural vibrations of the crankshaft 10 can be modifed by replacing the driver disc 12 with a new one, making it easy for car manufactures to conduct tuning or adjustment work.

What is claimed is:

1. A system for minimizing vibrations in an engine crankshaft, comprising:

a friction clutch having a friction pad assembly;

a flywheel which is a part of said friction clutch and engageable with said friction pad assembly;

a driver disc secured to said flywheel, said driver disc being securable to the engine crankshaft for rotation therewith about an axis;

said driver disc being resilient and possessing a first rigidity, within a plane normal to said axis, high enough to transmit torque between the engine crankshaft and said flywheel, and a second rigidity, within a plane including said axis, which is lower than said first rigidity, said driver disc having a series of pockets spaced along a circle about said axis and inertia weights positioned and arranged to roll in said respective pockets.

2. A system as claimed in claim 1, wherein said driver disc and said flywheel define therebetween a space adjacent said pockets.

3. A system as claimed in claim 2, wherein said flywheel has an axially projecting enlargement extending along a circle about said axis and positioned adjacent an outer circumference thereof, and said driver disc abuts said axially projecting enlargement to define said space.

4. A system as claimed in claim 3, wherein said flywheel has a central aperture and has an inner edge defining said central aperture, and a control ring is provided which has a flange fixedly attached to said driver disc and means for limiting axial displacement, with respect to said axis of rotation, of said inner edge of said flywheel relative to said driver disc.

5. A system as claimed in claim 1, wherein said pockets are spaced equi-distant along a circle about said axis.

6. In combination:

an engine crankshaft;

a friction clutch having a friction pad assembly;

a flywheel which is a part of said friction clutch and engageable with said friction pad assembly;

a driver disc secured to said engine crankshaft and said flywheel for rotation therewith about an axis;

said driver disc being resilient and possessing a first rigidity, within a plane normal to said axis, high enough to transmit torque between said engine crankshaft and said flywheel, and a second rigidity, within a plane including said axis, which is lower than said first rigidity, said driver disc having a series of pockets spaced along a circle about said axis and inertia weights positioned and arranged to roll in said respective pockets.

\* \* \* \* \*